United States Patent [19]

Lee

[11] 3,822,364

[45] July 2, 1974

[54] MODE SELECTOR FOR TELEPHONE STATION SETS

[75] Inventor: Allan Yook Foo Lee, London, Ontario, Canada

[73] Assignee: Bell-Northern Research Ltd., Ottawa, Ontario, Canada

[22] Filed: Feb. 5, 1973

[21] Appl. No.: 329,699

[52] U.S. Cl. .............................. 179/2 C, 179/1 SW

[51] Int. Cl. ......................... H04m 1/00, H04m 9/00

[58] Field of Search ........................... 179/2 DP, 6 R

[56] References Cited

UNITED STATES PATENTS

| | | | |
|---|---|---|---|
| 3,475,557 | 10/1969 | Morse et al. | 179/2 DP |
| 3,517,137 | 6/1970 | Ribner | 179/81 R |

*Primary Examiner*—William C. Cooper

*Attorney, Agent, or Firm*—John E. Mowle

[57] ABSTRACT

A mode selector for connecting various electronic attachment circuits to a telephone line under control of a telephone station set. A single set of make contacts, forming part of the hook-switch contacts generally available in telephone station sets, is used in conjunction with the mode selector circuitry to perform the dual functions of releasing said attachment circuit from the telephone station set while transferring control from said attachment circuit to the conventional station set when the handset is taken off-hook, and controlling the hold or "A" lead operation used on conventional key-telephone station sets. The established connection may be released by placing the hand set on-hook, if the station handset is in use, or by disconnecting said attachment circuit from the telephone line if said attachment circuit is in use as the call is completed.

3 Claims, 1 Drawing Figure

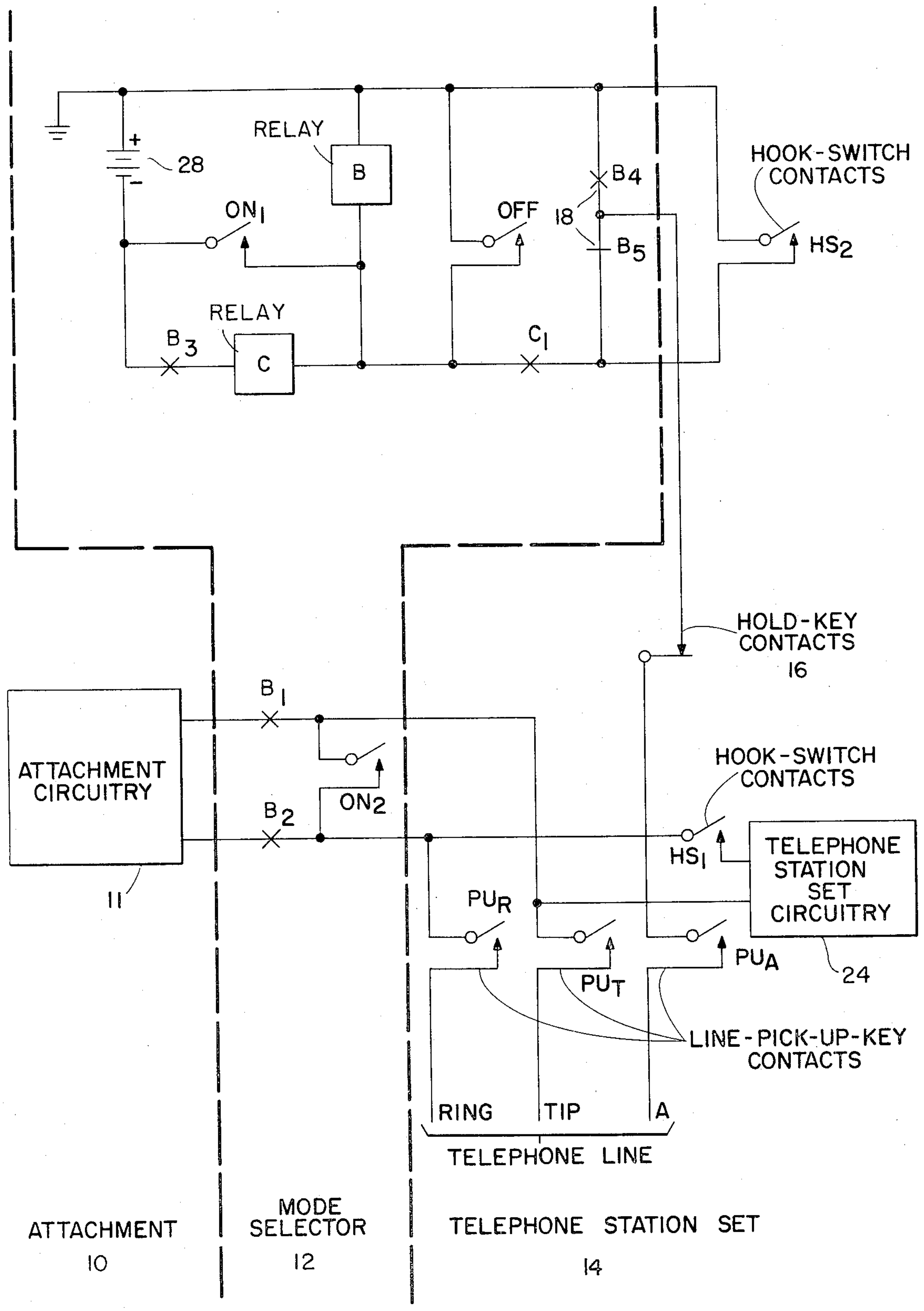
RELAY
B
28
ON1
OFF
B4
18
B5
HOOK-SWITCH CONTACTS
HS2
RELAY
C
B3
C1
HOLD-KEY CONTACTS
16
B1
ATTACHMENT CIRCUITRY
ON2
B2
HOOK-SWITCH CONTACTS
HS1
TELEPHONE STATION SET CIRCUITRY
11
PUR
PUT
PUA
24
LINE-PICK-UP-KEY CONTACTS
RING
TIP
A
TELEPHONE LINE
ATTACHMENT
10
MODE SELECTOR
12
TELEPHONE STATION SET
14

MODE SELECTOR FOR TELEPHONE STATION SETS

FIELD OF THE INVENTION

This invention relates to telephone station sets and more particularly to a mode selector for connecting a selected electronic attachment circuit to the telephone line at, and under control of, the telephone station set.

DESCRIPTION OF THE PRIOR ART

Many circuits are currently in use to connect selected electronic attachment circuits such as amplifiers, tape recorders and the like to the telephone line. In most of these arrangements separate hook-switch contacts are used to automatically cut-off the electronic attachment circuitry as the handset is taken off-hook and to provide continuity control for the well known hold or "A" lead used, almost universally, in key-telephone station systems. In the 3 type Speakerphone Systems manufactured by the Northern Electric and Western Electric companies, for example, the break portion of a set of continuity transfer contacts in the hook-switch is used to provide the automatic cut-off function, while the make portion is used for the "A" lead control. One undesirable feature of this type of contact arrangement is the need for continuity transfer in the hook-switch. As only a limited number of telephone sets in use today are already provided with the particular contact arrangement used in the 3 type Speakerphone systems, or the two spare sets of contacts used in other systems, a mode selector designed with these contact restrictions would not find universal application.

Unlike the aforementioned circuit arrangements, the mode selector circuit embodying this invention requires a single set of make contacts under control of the hook-switch in addition to the usual make contacts used to connect and disconnect the telephone station set voice and signalling circuitry from the telephone line. As a single set of make contacts can be readily made available in almost all telephone sets regardless of manufacture, a mode selector circuit controllable by a single set of make contacts has almost universal application as an interface circuit between telephone station sets manufactured by a large number of different manufacturers and any one of a number of electronic attachment circuits.

SUMMARY OF THE INVENTION

It has been found that a spare set of make contacts, mechanically linked to the telephone hook-switch, can be used to automatically disconnect a selected electronic attachment circuit from the telephone line when the telephone handset is taken off-hook and to provide, in the case of a key-telephone set, a means of maintaining continuity on the hold or "A" lead during a call and interrupting said lead upon completion of a call. Although the mode selector circuitry described herein is primarily designed for key-telephone systems, it can be readily used on ordinary single pair subscriber telephone lines with no loss in flexibility or circuit changes.

Thus in accordance with the present invention the mode selector serves to connect a selected electronic attachment circuit to a telephone line at a subscriber station serviced by a telephone station set. The telephone station set having first hook-switch make contacts to connect the telephone station set voice circuitry to the telephone line when the telephone handset is in the off-hook position and second hook-switch make contacts for "A" lead control. The mode selector comprises a first relay having first make contacts and second make contacts, where the first make contacts of the first relay are used to connect the selected attachment to the telephone line. A first momentary make contact switch, having momentary make contacts forming part of a series circuit with the coil of the first relay, initiates the operation of the first relay, while the second make contacts of the first relay lock the first relay in its operated stage by state the momentary make contacts of the first momentary make contact switch.

A means is provided for connecting the second hook-switch make contacts in shunt with the coil of the first relay to prevent operation of, or force release of, the first relay when the second hook-switch make contacts are closed as a result of the telephone handset being, or being placed, in the off-hook position.

When the first momentary make contact switch is actuated, the first relay operates to connect the selected attachment circuit across the telephone line via the first make contacts of the first relay if the handset is, or is subsequently placed in its on-hook position. The attachment circuit, or attachment for simplicity, is automatically disconnected from the telephone line by shorting the coil of the first relay with the second hook-switch make contacts as the handset is taken off-hook. Alternately a set of momentary make contacts associated with an OFF switch can be used to manually short the coil of the first relay so as to disconnect the attachment from the telephone line.

BRIEF DESCRIPTION OF THE DRAWINGS

An example embodiment of the invention will now be described with reference to the accompanying drawing of a mode selector in accordance with the present invention.

DESCRIPTION OF A PREFERRED EMBODIMENT

In the single drawing an attachment 10, a mode selector 12, and a telephone station set 14 are shown separated by dashed vertical lines for clarity of description and understanding. Various electrical contacts are associated with each other and/or with a relay coil. In these cases, the sets of contacts will be identified by a base reference character and the individual contacts further identified by a subscript.

The attachment 10 which is represented in the sole drawing by a functional block labelled attachment circuitry 11, may be an amplifier, tape recorder or the like. In one envisioned application the attachment circuitry 11 would include a plurality of amplifiers, a speaker and a microphone arranged for reception and transmission of signals along the telephone line to provide hands-free service at the subscriber station.

With regards to the telephone station set circuit 14 only a small portion of the relevant circuitry found in present day key telephone systems is shown in the drawing. Three line pick-up key contacts $PU_R$, $PU_T$ and $PU_a$ are shown, of which line pick-up key contacts $PU_R$ and $PU_T$ serve to interrupt the ring and tip leads respectively, where the ring and tip leads are the standard recognized lead designations for the talking pair of wires.

The third illustrated line pick-up key contact $PU_A$ forms part of a series line holding circuit with hold-key break contacts 16. In a conventional subscriber key-telephone set, the hold or "A" lead is connected via line pick-up key contact $PU_A$, hold-key break contacts 16 and hook-switch make contacts $HS_2$ to ground.

In the embodiment illustrated in the sole drawing, transfer switch contacts 18, forming part of the mode selector 12, have been incorporated in the "A" lead circuit. When the telephone station set 14 is being used in the conventional manner, the telephone handset (not shown) is off-hook, and second hook-switch make contacts $HS_2$ are closed. In addition, as will be explained in the description of the mode selector 12, break contacts $B_5$ of the transfer switch contacts 18 are also closed. Therefore, under conventional use, (when the telephone handset is in use) the "A" lead is connected to ground potential via a series circuit including operated or closed line pick-up key contacts $PU_A$, closed hold-key contacts 16, closed break contacts $B_5$ of transfer switch contacts 18, and closed hook-switch contacts $HS_2$. The contact positions illustrated in the sole drawing depict the contact positions under conventional use. When the attachment 10 is in use at the telephone station, break contacts $B_5$ of the transfer switch 18 are released and make contacts $B_4$ are closed. When the attachment circuit is in use, therefore, the "A" lead is connected to ground through closed line-pick-up key contacts $PU_A$, closed hold-key contacts 16 and closed make contacts $B_4$ of the transfer switch contacts 18. In addition to the key and hook-switch contacts described, the telephone station set includes first make contacts $HS_1$ of the hook-switch which are used to connect the telephone station set voice and signalling circuitry 24 to the ring and tip leads of the telephone lines when the telephone handset (not shown) is taken "off-hook." Note the hook-switch, hold-key and line pick-up keys are not shown in the sole drawing. Only the contacts of the hook-switch, hold-key and line pick-up keys which are relevant to this description are shown in the sole drawing.

In the mode selector 12, coil B of a first relay is connected via momentary make contacts $ON_1$ of a momentary make contact switch ON (not shown) to a source of direct current 28. A series arrangement of make contacts $B_3$ of the first relay and coil C of a second relay shunt the momentary make contacts $ON_1$ of the ON switch to provide a lock circuit for the first relay coil B. Momentary make contacts $OFF_1$ of an OFF switch, which is also not shown, are connected across relay coil B to forcibly release it as will be explained later. The hook-switch make contacts $HS_2$ are connected in shunt with coil B of the first relay through make contacts $C_1$ of the second relay. Make contacts $B_4$ and break contacts $B_5$ of the transfer switch contacts 18 of the first relay are also shunted by the second hook-switch make contacts $HS_2$. The junction of the transfer switch contacts 18 are connected to the hold-key contacts 16 to form part of the hold or "A" lead described above. Additional make contacts $B_1$ and $B_2$ of the first relay serve to connect the attachment circuitry 11 to the tip and ring leads of the telephone line when line pick-up key contacts $PU_T$ and $PU_R$ are closed, and the first relay is operated. To prevent any possibility of "howling" during the transition from handset operation to attachment operation (particularly when the attachment circuitry 11 provides hands-free operation) momentary make contacts $ON_2$ of the momentary make switch ON momentarily shunt the attachment circuitry 11 by momentarily shorting the Tip and Ring leads of the telephone line during the transition interval.

OPERATION OF THE PREFERRED EMBODIMENT

NORMAL HANDSET OPERATION

When the handset (not shown) of the telephone station set 14 equipped with mode selector circuitry, as previously described is in use the operation of said handset is basically electrically identical to the operation of a conventional key-telephone set. Initially a particular line is selected by actuating a corresponding line pick-up key to close a set of line pick-up key contacts typified by contacts $PU_R$, $PU_T$ and $PU_A$ in the sole drawing. When the telephone hand-set is taken off-hook the hook-switch contacts $HS_1$ close to connect the telephone station set voice and signalling circuitry 24 to the telephone line via operated line pick-up key contacts $PU_R$ and $PU_T$. The selection of said particular line completes a path to ground through closed line pick-up key contacts $PU_A$, closed hold-key contacts 16, closed break-contacts $B_5$, of the transfer switch 18, and closed hook-switch make contacts $HS_2$ to establish the hold or "A" lead control path. As the function of the hold or "A" lead is well known in the art associated with key-telephone stations it suffices to say that a ground potential should be present on the "A" lead after a line has been selected and the hook-switch is taken off-hook. To place the selected line on hold, the aforementioned ground potential on the "A" lead is momentarily interrupted by momentarily releasing normally closed break contacts 16 via the hold-key.

OPERATION WITH ATTACHMENT CIRCUITRY

Once a line has been selected by the telephone station set circuitry 24 and a connection has been established to a called party, the attachment 10 can be connected to the telephone line by actuating the ON switch so as to close momentary make contacts $ON_1$ of the ON switch. After momentary make contacts $ON_1$ close, current flows from the source of direct current 28 through the coil B of the first relay to operate the first relay and close associated first relay contacts $B_1$, $B_2$, $B_3$ and $B_4$ while opening contact $B_5$. As make contacts $B_3$ close, a lock circuit is established from the source of direct current 28 to the coil B of the first relay through operated make contacts $B_3$ and coil C of the second relay. When make contacts $B_1$ and $B_2$ close, the attachment circuitry 11 is connected across the selected telephone line in parallel with the telephone station set circuitry 24.

After the first relay has operated, make transfer contacts $B_4$ close and break transfer contacts $B_5$ open to establish a ground potential on the "A" lead independent of the position of the second hook-switch make contacts $HS_2$. As long as the ON button is actuated, make contacts $ON_2$ remain closed to shunt the attachment circuitry 11 and to prevent any occurrence of "howling" due to acoustical feedback, between the attachment circuitry 11 and an off-hook handset. After the ON switch is released to allow current to flow through the second relay coil C, the second relay operates to close corresponding make contacts $C_1$. If the handset is in the off-hook position when make contacts $C_1$ of the second relay have closed, the first relay will be forcibly released by the shunting effect of closed hook-switch contacts $HS_2$ across the coil B of the first relay. For a smooth transfer from the handset to the attachment circuitry 11 make contacts $ON_1$ of the ON switch should be held in their closed position until after the handset has been returned to its on-hook position. The use of a second relay C, which operates only after the ON switch contacts $A_1$–$A_5$ are released, prevents chattering of the first relay contacts which would normally occur if the ON switch were actuated while the second hook-switch contacts $HS_2$ were closed.

A call may be received at the telephone station set 14 by selecting the telephone line corresponding to the incoming call with the appropriate line pick-up key and taking the handset off-hook in the conventional manner, or by leaving the handset on-hook and momentarily actuating the ON switch to connect the attachment circuitry 11 to the selected telephone line. If the call is to be received with the attachment circuitry 11, the ON switch need only be momentarily actuated as the second hook-switch contacts $HS_2$ will not be closed to shunt the first relay coil B upon the closure of contacts $C_1$ of the second relay.

The attachment circuitry 11 can be automatically disconnected from the telephone line and the conversation continued via the telephone handset by simply lifting said handset (not shown) off its on-hook position. Lifting the handset off-hook shunts the coil B of the first relay with the second hook-switch contacts $HS_2$ thereby forcing a release of the attachment circuitry 11. Alternately, the attachment circuitry 11 may be force-released, to terminate the established connection with the other party, by actuating the OFF switch and thereby shunting the coil B of the first relay with make contacts OFF.

What is claimed is:

1. A telephone station comprising:

a telephone set having first and second hook-switch make contacts, the first hook-switch make contacts for connecting the telephone set to a telephone line when the set is in an off-hook condition, the set also having a control lead for reflecting the condition of said telephone set;

an attachment for alternate connection to said telephone line; and a mode selector, for controlling the alternate connection of the attachment to the telephone line, including:

a first relay in shunt with said second hook-switch make contacts so that the first relay is released when the telephone set is in an off-hook condition; the first relay including:

first make contacts for connecting the attachment to the telephone line, second make contacts for holding the relay in an actuated condition, and third make and first break contacts in series connection across said second hook-switch make contacts, the junction of the third make and first break contacts being connected to the control lead to establish a connection to the control lead through the first break contacts and the second hook-switch make contacts when the telephone set is in an off-hook condition, and to establish an alternate connection to the control lead through the third make contacts when the telephone set is in an on-hook condition.

2. A telephone station as defined in claim 1 in which the mode selector further includes:

a second relay connected in series with the second make contacts of the first relay, the second relay including make contacts connected in series with the second hook-switch make contacts across the first relay; and a first momentary make contact switch, connected in shunt with the series combination of the second relay and the second make contacts of the first relay, the first momentary make contact switch also being connected in series with the first relay across a source of voltage to initiate operation of the relay upon actuation thereof.

3. A telephone station as defined in claim 2 in which the mode selector further includes:

a second momentary make contact switch connected in shunt with the first relay to forcibly release the first relay and disconnect the attachment upon operation thereof.

* * * * *